(12) United States Patent
Bischoff (10) Patent No.: US 12,179,646 B2
(45) Date of Patent: Dec. 31, 2024

(54) IMPULSE COMPENSATING SEAT SUSPENSION

(71) Applicant: Eric Bischoff, Sag Harbor, NY (US)

(72) Inventor: Eric Bischoff, Sag Harbor, NY (US)

( * ) Notice: Subject to any disclaimer, the term of this patent is extended or adjusted under 35 U.S.C. 154(b) by 108 days.

(21) Appl. No.: 17/737,577

(22) Filed: May 5, 2022

(65) Prior Publication Data
US 2023/0356634 A1  Nov. 9, 2023

(51) Int. Cl.
*B60N 2/50* (2006.01)
*B60N 2/52* (2006.01)
*B60N 2/54* (2006.01)
*B60N 2/68* (2006.01)
*A47C 1/02* (2006.01)

(52) U.S. Cl.
CPC ............. *B60N 2/505* (2013.01); *B60N 2/504* (2013.01); *B60N 2/522* (2013.01); *B60N 2/544* (2013.01); *B60N 2/68* (2013.01); *A47C 1/02* (2013.01)

(58) Field of Classification Search
CPC ........ B60N 2/505; B60N 2/504; B60N 2/522; B60N 2/544; B60N 2/68; A47C 1/00
See application file for complete search history.

(56) References Cited

U.S. PATENT DOCUMENTS

| | | |
|---|---|---|
| 1,093,741 A | 4/1914 | Stoll |
| 1,127,413 A | 2/1915 | Davis |
| 1,400,974 A | 12/1921 | Parker |
| 1,774,555 A | 9/1930 | Horsley et al. |
| 2,298,230 A | 10/1942 | Radke |
| 2,331,990 A | 10/1943 | McArthur |
| 2,685,324 A | 8/1952 | Kramer |
| 2,637,368 A | 5/1953 | Cotton |
| 2,787,315 A | 4/1957 | Siebert |

(Continued)

FOREIGN PATENT DOCUMENTS

ES   2111417 A1 *  3/1998  ............. B60N 2/504

OTHER PUBLICATIONS

Mariner Suspension Seats Brochure, Seats Incorporated, Reedsburg, Wisconsin, 1990.

(Continued)

*Primary Examiner* — Tan Le
(74) *Attorney, Agent, or Firm* — Hoffmann & Baron, LLP (57) ABSTRACT

A seat suspension including a base frame having a back portion and a bottom portion fixedly securable to a support surface. A carriage assembly is movably connected to the base frame. The carriage assembly includes a transverse member slidably connected to the base frame and a vertical guide member extending upwardly from the transverse guide member and movably connected to the base frame. The carriage assembly includes a suspension support having a first end pivotally secured to the transverse member. A shock compensating mechanism including an adjustment member is slidably disposed on a pivot surface secured to the transverse guide member. Movement of the adjustment member changes shock compensation properties of the shock compensating mechanism. A height adjustment mechanism disposed on the frame includes an actuator wherein operation of the actuator selectively moves the seat frame, the carriage assembly, and the shock compensating mechanism relative to the base frame.

30 Claims, 7 Drawing Sheets

(56) References Cited

U.S. PATENT DOCUMENTS

| | | | |
|---|---|---|---|
| 2,828,801 A | 4/1958 | Papst | |
| 2,892,482 A | 6/1959 | Beoletto | |
| 2,893,470 A | 7/1959 | Peller | |
| 3,163,409 A | 12/1964 | Running et al. | |
| 3,186,674 A | 6/1965 | O'Link | |
| 3,325,136 A | 6/1967 | Radke et al. | |
| 3,339,906 A | 9/1967 | Persoon | |
| 3,593,953 A | 7/1971 | Auer | |
| 3,601,351 A | 8/1971 | Ambrosius | |
| 3,823,932 A | 7/1974 | Simons | |
| 3,861,637 A * | 1/1975 | DeLongchamp | B60N 2/504 248/576 |
| 4,047,759 A | 9/1977 | Koscinski | |
| 4,128,217 A | 12/1978 | Mazelsky | |
| 4,186,963 A | 2/1980 | Koutsky | |
| 4,198,092 A | 4/1980 | Federspiel | |
| 4,401,342 A | 8/1983 | Andersson | |
| 4,662,597 A * | 5/1987 | Uecker | B60N 2/504 297/307 |
| 4,678,155 A | 7/1987 | Carter | |
| 4,709,649 A | 12/1987 | Wann | |
| 4,809,944 A | 3/1989 | Smith et al. | |
| 4,856,763 A | 8/1989 | Brodersen | |
| 4,883,249 A | 11/1989 | Garland | |
| 4,943,037 A | 7/1990 | Brodersen | |
| 4,977,848 A | 12/1990 | Currey | |
| 5,029,888 A | 7/1991 | Allsop | |
| 5,044,299 A | 9/1991 | Frank | |
| 5,044,587 A | 9/1991 | Degen | |
| 5,080,318 A | 1/1992 | Takamatsu | |
| 5,125,631 A | 6/1992 | Brodersen | |
| 5,154,402 A | 10/1992 | Hill | |
| 5,169,112 A | 12/1992 | Boyles et al. | |
| 5,176,355 A | 1/1993 | Carter | |
| 5,222,709 A | 6/1993 | Culley | |
| 5,234,203 A | 8/1993 | Smith | |
| 5,273,260 A | 12/1993 | Nagata | |
| 5,294,085 A | 3/1994 | Lloyd et al. | |
| 5,309,861 A | 5/1994 | Mardikian | |
| 5,324,095 A * | 6/1994 | Yamauchi | B60N 2/544 297/216.16 |
| 5,367,978 A | 11/1994 | Mardikian | |
| 5,382,038 A | 1/1995 | Allsop | |
| 5,395,089 A | 3/1995 | Yamauchi et al. | |
| 5,451,094 A | 9/1995 | Templin et al. | |
| 5,542,371 A | 8/1996 | Harvey et al. | |
| 5,642,916 A | 7/1997 | Dybro et al. | |
| 5,676,336 A | 10/1997 | Nefy et al. | |
| 5,735,509 A | 4/1998 | Gryp et al. | |
| 5,758,859 A | 6/1998 | Gonzalez | |
| 6,237,889 B1 | 5/2001 | Bischoff | |
| 6,257,663 B1 | 7/2001 | Swierczewski | |
| 8,047,596 B2 | 11/2011 | Jungert | |
| 8,186,737 B2 | 5/2012 | Jungert | |
| 8,684,339 B2 | 4/2014 | Deml | |
| 8,690,114 B2 | 4/2014 | Boyarski | |
| 9,016,787 B2 | 4/2015 | Romer | |
| 10,682,933 B2 * | 6/2020 | Bischoff | B60N 2/505 |
| 2011/0024958 A1 | 2/2011 | Deml et al. | |

OTHER PUBLICATIONS

Garelick Active Seat Suspension Unit, product literature, 1999.
Marine Seats—Suspension, Bentley's Manufacturing Inc., product literature, 1999.

* cited by examiner

IMPULSE COMPENSATING SEAT SUSPENSION

FIELD TECHNOLOGY

The present disclosure relates to a seat suspension assembly having shock absorbing capabilities for accommodating impulses and shock waves imparted thereto. More particularly, the present disclosure relates to an adjustable seat suspension assembly for use in watercraft or land vehicles having an adjustable shock accommodating and dissipating capability for isolating an occupant of the seat from shock waves imparted on the watercraft or vehicle.

BACKGROUND

It is well known that occupants of watercrafts, especially small boats, may experience a jarring and unsettling ride as the boat moves through the water. As the waves impact the hull of the boat, the shock waves are almost directly transferred to the occupant. Such shock waves can seriously diminish the enjoyment and comfort of the boat passengers. In extreme cases, the harshness of the ride may lead to spinal injuries or at the very least aggravate preexisting spinal conditions. The discomfort is especially prevalent if the boat is relatively small and is moving fast through choppy water.

The harshness of the ride is often only slightly mitigated by the typical boat seat. Standard boat seats are rigidly secured to the deck of the boat and include a cushion material which provides only a minimal amount of shock accommodation and dissipation. Therefore, an occupant sitting in a typical boat seat is subjected to some discomfort as the boat travels through the water. Such discomfort is especially troublesome if the occupant is suffering from a sore back or neck and may lead to individuals refraining from engaging in watercraft associated activities. In addition to the discomfort resulting from the motion of the boat as it travels through the water, the driver of the boat may find it difficult to maintain control since they are being tossed about. Such a jarring ride makes it difficult to hold the steering device steady and to maintain control over the throttle.

The experience of being tossed about in one's seat can also be experienced by those riding in land vehicles, especially off-road passenger vehicles and/or construction vehicles. Even though such vehicles include suspension systems which are designed to somewhat isolate the occupants from the irregularities in the roadway, the suspension systems are limited in their capacity to do that and the passengers still can receive significant shock or vibrations especially if the vehicle is moving rapidly over rough terrain.

Attempts have been made in the prior art in order to accommodate shock waves imparted to boats or land vehicles. One such attempt is disclosed in U.S. Pat. No. 5,044,299 to Frank. Frank discloses a seat construction for a boat that comprises a support sleeve arranged for mounting on a boat with a longitudinal axis vertical to the boat. An elongate seat support element is slidable longitudinally of the sleeve and is configured and is confined by an upper bearing element of the sleeve and a lower bearing element of the sleeve. A spring is retained within the sleeve and adapted to permit the seat support element to extend therein. The seat support element is permitted to move under bias of the spring in a vertical direction. Therefore, the seat construction provides flexibility to the seat in order to accommodate vertical shock. However, the Frank device does not provide a mechanism for the seat occupant to adjust the characteristics to accommodate shock. Furthermore, there is no separate shock-dampening device; therefore, the occupant may end up bouncing up and down with the seat in an exaggerated manner in response to a shock wave hitting the boat.

U.S. Pat. No. 2,893,470 to Peller discloses an adjustable seat with shock adsorbing capabilities. The seat includes a pair of telescoping cylinders which contain a coil spring surrounding a hydraulic shock absorber. The height of the seat can be adjusted by rotation of a handle which, through a series of gears, adjusts the distance between the bottom of the shock absorber and the bottom of the surface to which the seat is mounted. This design does not give the seat occupant the ability to adjust the shock dampening characteristics of the suspension.

Use of telescoping cylinders with a spring and shock absorbing apparatus formed therein is also disclosed in U.S. Pat. No. 1,400,974 to Parker. This design discloses the use of two pedestals formed underneath the seating surface.

Accordingly, it would be desirable to provide a seat and suspension system having a suspension system absorbing vibrations and impacts imparted thereto.

SUMMARY

It is an advantage of the present disclosure to provide a seat suspension assembly for isolating an occupant of the seat from shocks imparted to the assembly.

It is another advantage of the present disclosure to provide an adjustable seat suspension assembly for adjusting the shock absorbing capabilities of the assembly.

It is yet another advantage of the present disclosure to provide a seat suspension assembly wherein the height of the seat is adjustable.

In the efficient attainment of these and other advantages, the present disclosure provides a seat suspension including a base frame fixedly securable to a structure. A seat frame is adapted to receive a seat, and the seat frame has a bottom portion and a back portion extending upwardly from the bottom portion. A carriage assembly is movably connected to the base frame. The carriage assembly includes a transverse member slidably connected to the base frame and a vertical guide member extending upwardly from the transverse guide member and movably connected to the base frame. The carriage assembly further includes a suspension support having a first end pivotally secured to the transverse member and a second opposed end. The seat frame base portion is pivotally secured to the suspension support. The seat frame back portion is connected to the vertical guide member and translatable relative thereto, wherein the seat frame back portion is restricted to movement along a linear axis parallel to a longitudinal axis of the vertical guide member. A shock compensating mechanism including an adjustment member which is slidably disposed on a pivot surface secured to the transverse guide member. The adjustment member has a first end slidingly secured to the suspension support and a second opposed end secured to a shock compensating device, the adjustment member being translatable relative to the pivot surface, wherein movement of the adjustment member changes shock compensation properties of the shock compensating mechanism.

The present disclosure further provides a seat suspension including a base frame having a back portion and a bottom portion, and the bottom portion is fixedly securable to a support surface. A carriage assembly is movably connected to the base frame. The carriage assembly includes a transverse member slidably connected to the base frame and a vertical guide member extending upwardly from the transverse guide member and movably connected to the base frame. The carriage assembly includes a suspension support having a first end pivotally secured to the transverse member. A shock compensating mechanism including an adjustment member is slidably disposed on a pivot surface secured to the transverse guide member. Movement of the adjustment member changes shock compensation properties of the shock compensating mechanism. A height adjustment mechanism is disposed on the frame. The height adjustment mechanism includes an actuator wherein operation of the actuator selectively moves the seat frame, the carriage assembly, and the shock compensating mechanism up and down relative to the base frame.

DETAILED DESCRIPTION

Figure 1:
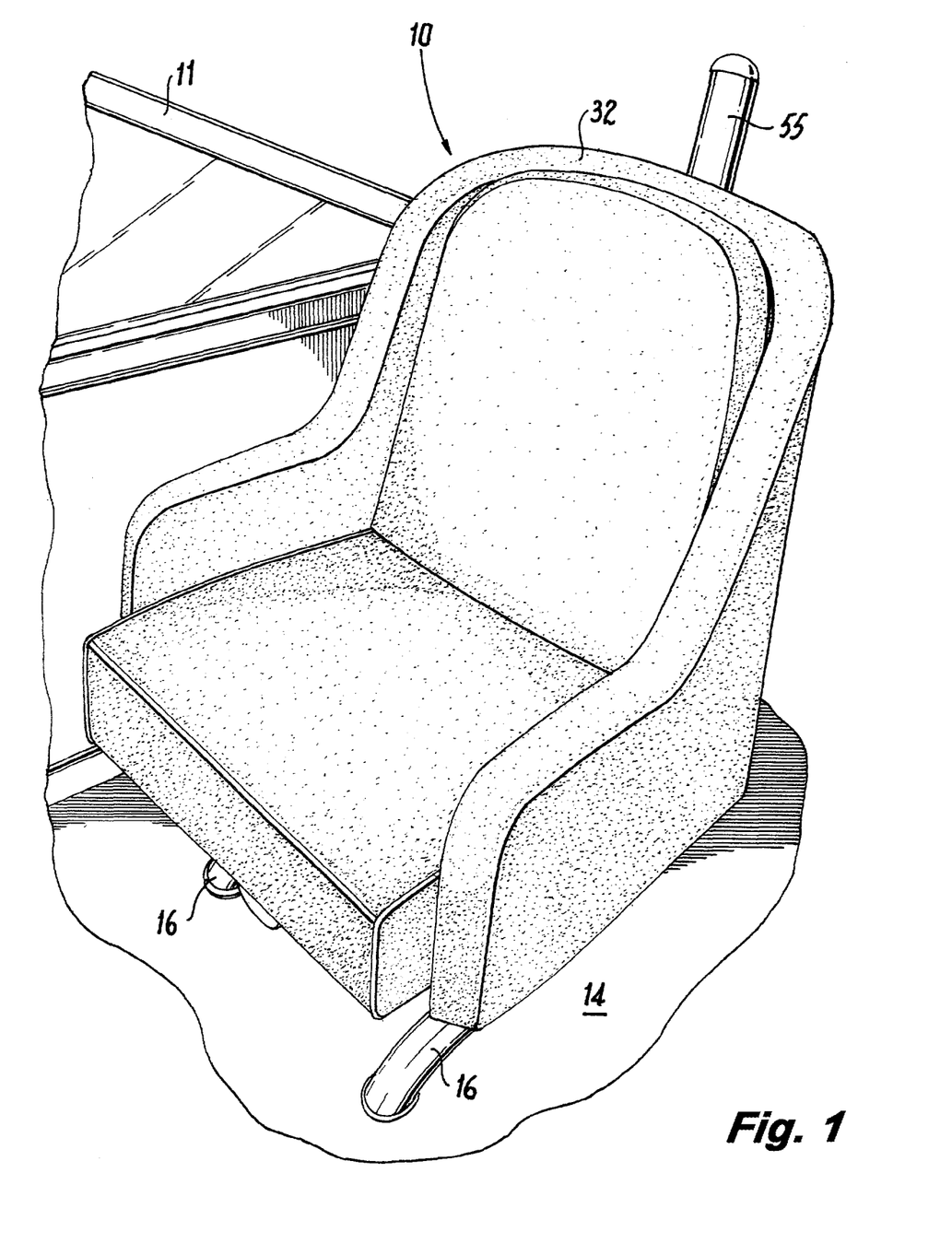
FIG. 1 is top perspective view of the seat suspension assembly of the present disclosure.
Figure 2:
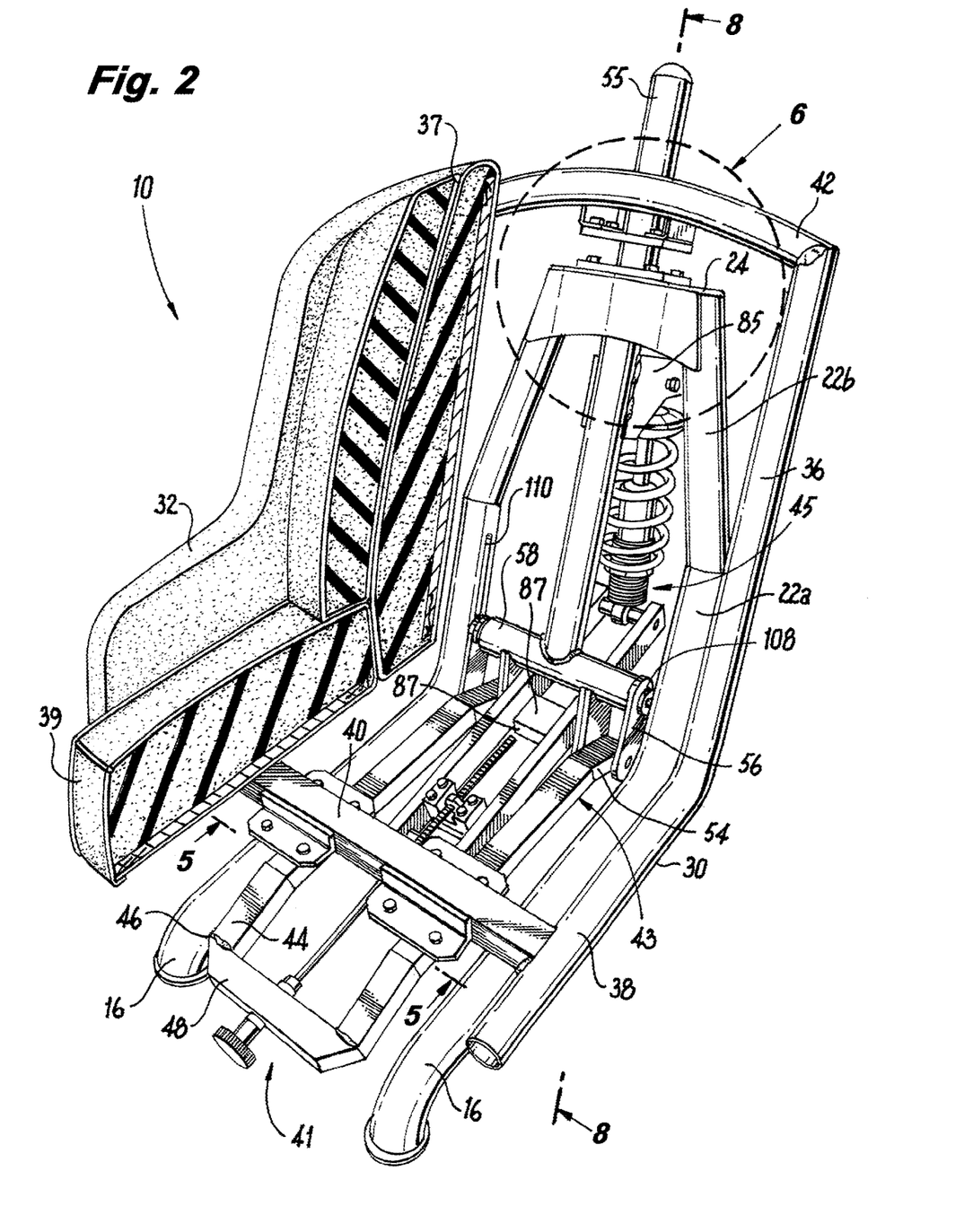
FIG. 2 is top perspective view of the seat suspension assembly of FIG. 1 with a portion of the seat removed for illustration purposes.
Figure 3:
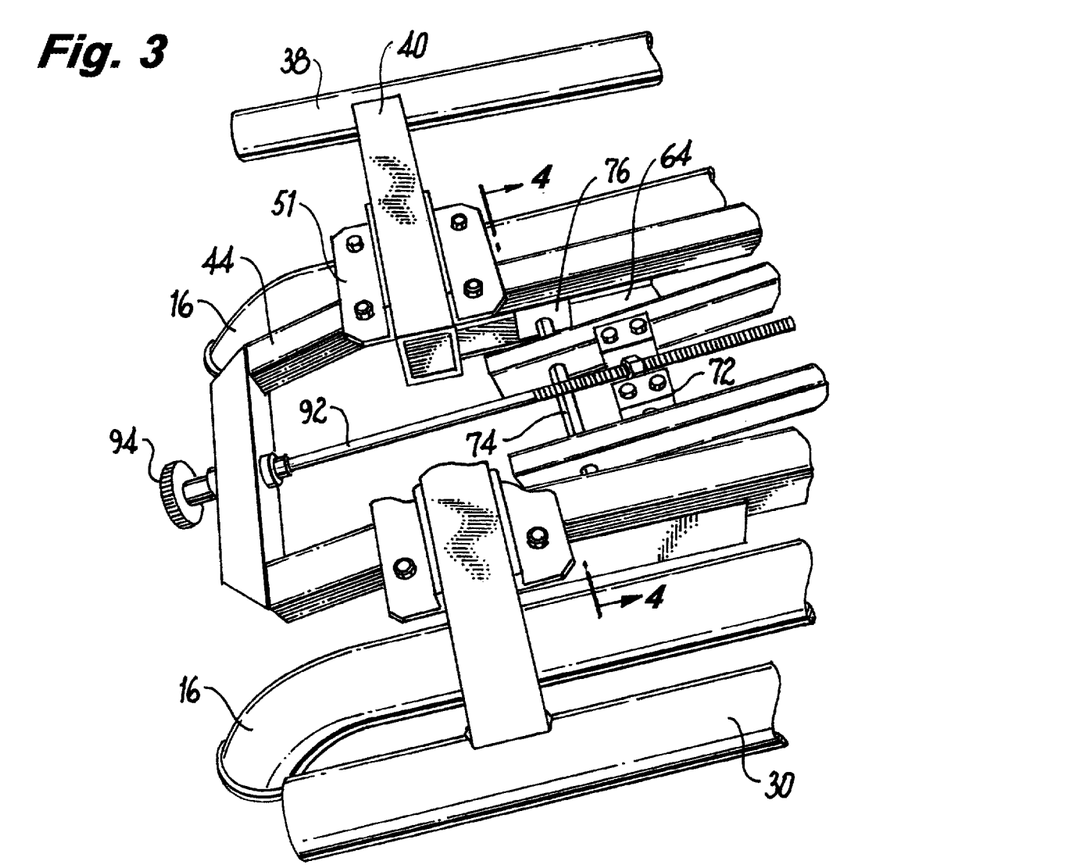
FIG. 3 is a partial perspective view of seat frame and suspension assembly.

With reference to FIGS. 1 and 2, the shock compensation seat assembly 10 of the present disclosure provides the ability to absorb impacts imparted to a watercraft or air or land vehicle, thereby substantially isolating the occupant of the seat from jarring shocks caused by such impacts. The seat assembly 10 may be used in a variety of applications, including boats, which are subjected to significant wave impacts as they travel through water, and land vehicles when driven on rough surfaces. Boats typically have a rigid hull construction and any impact imparted on the hull is transferred directly to a seat and its occupant. Even watercraft having inflatable hulls have operational hull pressures which form a fairly rigid hull resulting in a jarring ride for the occupants. The seat assembly 10 provides the ability to reduce the effects for the impacts by dampening the shock impulses and isolating the occupant of the seat from the craft. This reduces the likelihood of injury and allows for a more comfortable and pleasant ride. In addition, seat assembly 10 permits an occupant who is driving the boat to remain relatively unjarred which increases the ability to properly control the steering wheel and throttle.

While the seat assembly 10 is particularly useful in watercraft 11, it is within the contemplation of the present disclosure that the seat assembly 10 may also be employed in other modes of transportation including land vehicles, such as sport utility vehicles and off-road construction equipment. Such vehicles also typically encounter significant shocks and impacts which are transmitted to the vehicle's occupants.

Figure 7:
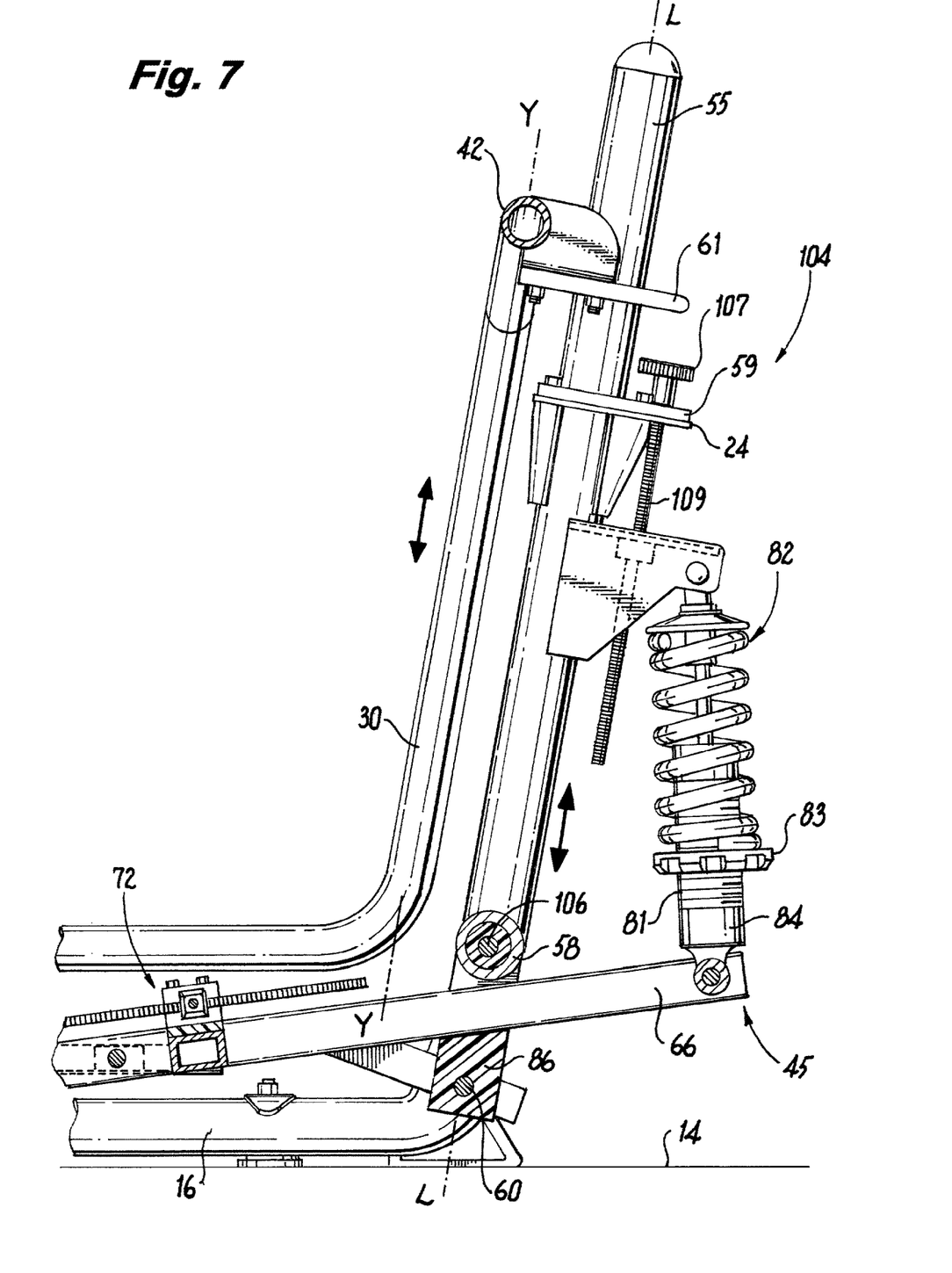
FIG. 7 is a side cross-sectional view of the seat frame and suspension assembly.

With further reference to FIGS. 1, 2, and 7, the seat assembly 10 includes a rigid base frame 12 securable to a support structure 14. Support structure 14 may be the deck of a watercraft or floor of a land vehicle. The base frame 12 includes a pair of generally L-shaped members including spaced bottom members 16 including openings 18 therein to receive fasteners 20 for securing the base frame 12 to the support structure 14. Extending upwardly from one end of each of the bottom members at a generally orthogonal orientation are back members 22. The back members 22 have a lower portion 22a that are substantially parallel to each other and an upper portion 22b wherein the members extend toward each other. The uppermost portions of the back members 22 are joined to each other by a rigid base cross member 24 extending therebetween. The base frame 12 remains stationary when secured to the support structure 14. The base frame 12 may be formed of tubular aluminum, steel, or other rigid material.

The seat assembly 10 may include a seat frame 30 for holding a passenger seat 32. The seat frame includes a pair of rigid generally L-shaped members 34 each having an upper portion forming a back support 36 for supporting the seat back 37 and a lower portion forming a bottom support 38 for supporting the seat bottom 39. The bottom supports 38 are elongate members rigidly secured together in a spaced arrangement by a bottom cross member 40. The back supports 36 are rigidly secured to each other by a top cross member 42 having a arcuate shape. The seat 32 may be secured to the seat frame 30 by fasteners (not shown) in a manner know in the art.

Figure 8:
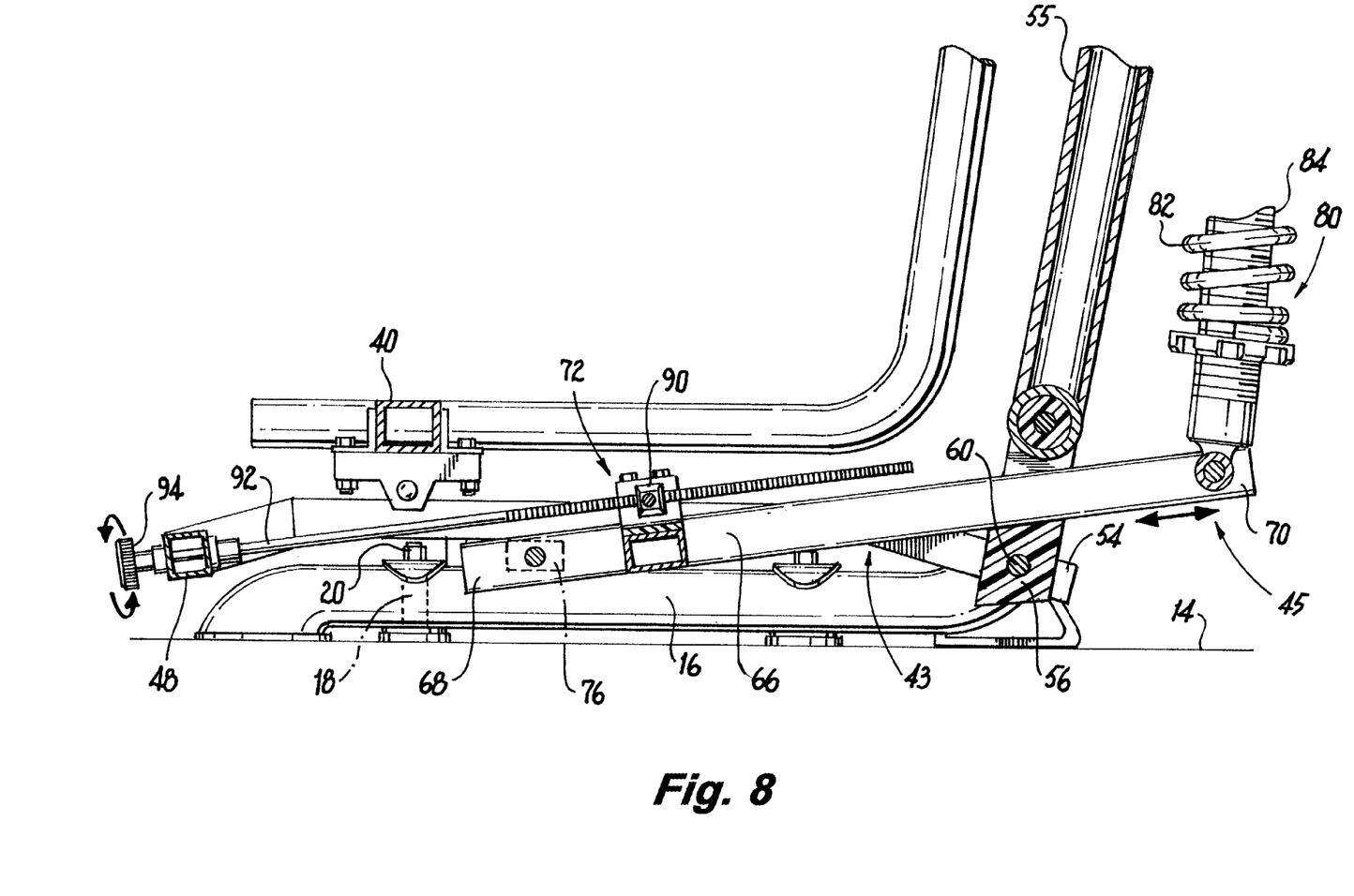
FIG. 8 is a partial side cross-sectional view taken through line 8-8 of FIG. 2 showing the suspension members in a forward position.
Figure 9:
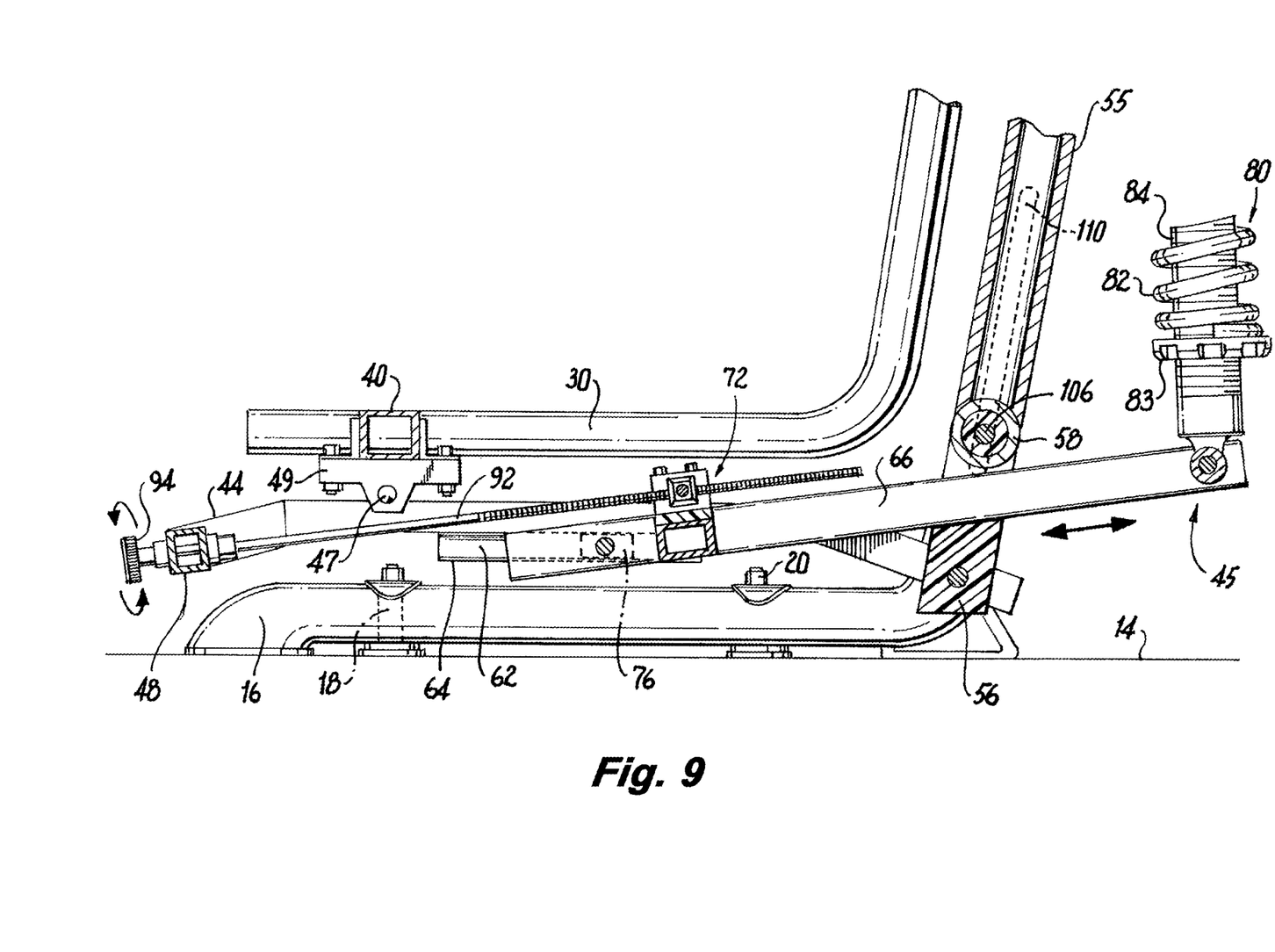
FIG. 9 is a partial side cross-sectional view taken through line 8-8 of FIG. 2 showing the suspension members in a rearward position

With reference to FIGS. 7-9, a seat carriage assembly 43 is disposed between the seat frame 30 and the base frame 12. The carriage assembly 43 permits the seat frame 30, and seat 32 secured thereto, to move in a guided manner relative to the base frame 12. A shock compensating mechanism 45 is disposed on the carriage assembly 43 to facilitate a controlled movement of the seat frame 30. The shock compensating mechanism 45 in combination with the carriage assembly 43 assists in isolating the seat occupant from the shocks and impacts imparted to the vehicle or craft.

The seat carriage assembly 43 includes a suspension support 41 including a pair of spaced support rails 44 joined at a front end 46 by a carriage cross member 48. Thus, the suspension support 41 has a generally U-shaped configuration. The support rails back ends 54 are each positioned between a pair of spaced brackets 56 extending downwardly from a crossbar 58. The crossbar 58 is movably supported between the frame members. A rod 60 extends through the pair of spaced brackets 56 and the support rails, thereby pivotally securing the support rails 44 to the crossbar 58. A rigid, vertically extending guide post 55 extends upwardly from the crossbar 58. The vertical guide post has a longitudinal axis L-L. The guide post 55 extends through an opening 57 formed in the base cross member 24. The cooperation between the post 55 and the base frame crossbar 58 guides and supports the carriage assembly 43 as it moves up and down when the seat height is adjusted, as will be described in detail below. Accordingly, as the carriage assembly 43 moves up and down, it maintains its orientation with respect to the guide post 55. The carriage assembly 43 moves up and down along an axis Y-Y which is parallel to the post's vertical axis L-L. In order to assist in smooth motion between the vertical post 55 and base frame, the cross member opening 57 may be bounded in whole or in part by friction reducing material 59, for example, as nylon or other polymer.

Figure 5:
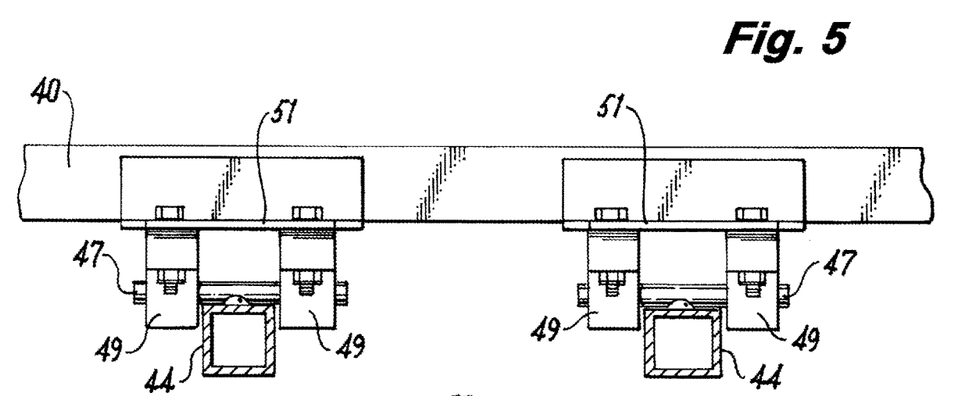
FIG. 5 is a cross-sectional view taken through line 5-5 of FIG. 2.

With reference to FIG. 5, the seat frame bottom 38 is connected to the support rails and the seat frame top cross member 42 of the back support 36 is connected to the vertical guide post 55. With regard to the bottom 38, each support rail 44 includes a trunnion rod 47 extending across its width. The bottom cross member 40 of the seat frame 30 includes two pairs of spaced cylindrical trunnion supports 49 for receiving the trunnion rods 47. Each pair trunnion supports 49 may be secured to a brace 51 fixedly secured to the cross member 40. The trunnion supports 49 may be formed of spaced nylon or other bearing material having a through hole to receive the trunnion rods. Alternatively, bearings or bushing may be used to rotatably support the trunnions. The trunnion supports 49 permits the seat frame 30 to pivot relative to the carriage assembly 43. It is also contemplated that the seat frame could have the trunnion rods and the rail have the trunnion supports.

The seat frame top cross member 42 may include a plate 61 having an opening 63 therein through which the post 55 extends. The plate 61 may be formed of a polymer to provide for smooth linear motion between the plate 61 and the post 55. As the seat frame 30 moves up and down due to motion of the craft, the seat back support 36 retains its orientation with respect to the guide post 55 and the base frame. The seat frame 30, and seat secured thereon, move up and down along an axis Y-Y which is parallel to the post's vertical axis L-L. Therefore, the seat back support can move up and down but not forward or back relative to the guide post 55 and base frame 12, which enhances the conform of the passenger sitting in the seat. In this way, a passenger in the seat 32 does not get moved forward and backwards relative to the fixed base frame 12 as the seat 32 moves up and down in response to impulses. This provides a comfortable motion for the passenger, especially if they are at the controls of the craft 11, since the passenger does not move toward and away from the typically positionally fixed controls.

Figure 4:
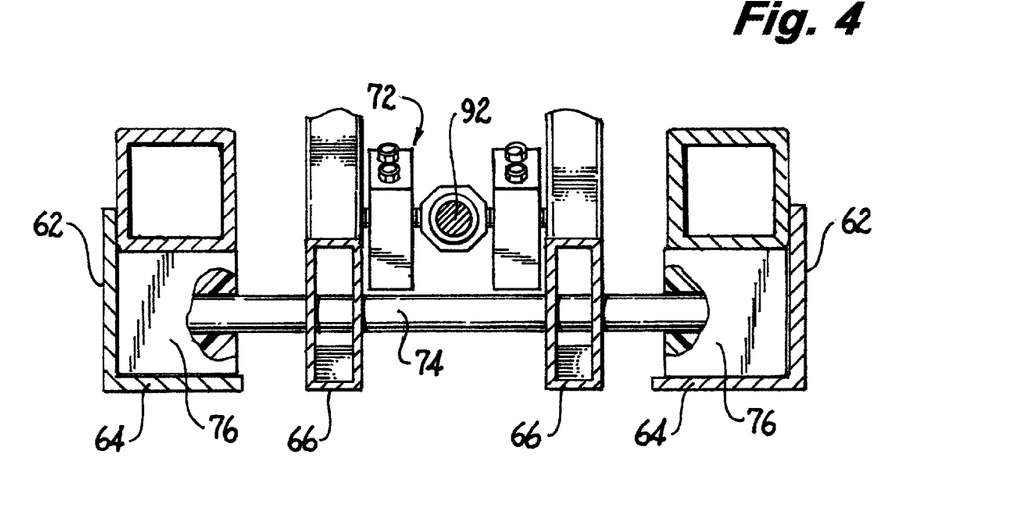
FIG. 4 is a cross-sectional view taken through line 4-4 of FIG. 3.

With reference to FIGS. 4 and 8, each support rail 44 includes an L-shaped channel 62 extending downwardly therefrom and extending along its length. The channel 62 defines an open slot 64 extending along a side of the rail. The two rail slots 64 face each other in opposed spaced relation and form a track.

With reference to FIGS. 4, 7, and 8, the shock compensating mechanism 45 includes a pair of spaced shock compensation adjustment members 66. The adjustment members 66 are rigid elongate bars having a proximal 68 and distal 70 ends. The adjustment member proximal ends 68 are disposed toward the front of the seat assembly 10 and are joined together in spaced relation by a bracket 72. Offset from the proximal ends 68 is a guide rod 74 transversely extending outwardly toward and into the channel slots 64. The opposed ends of the guide rod 74 each extend into a guide block 76 which is configured to slide along the length of the track created by channel 62. The guide blocks 76 may be made of nylon or other friction reducing bearing material as is known in the art. The cooperation between the channels 62 and guide blocks 76 allows the adjustment members 66 to translate forward and rearward with respect to the support rails 44.

A seat occupant may move the suspension members 66 to change the shock compensation properties of the suspension assembly with an adjustment mechanism 89. In one embodiment, the adjustment mechanism includes a guide nut 90 pivotally secured on the bracket 72 connecting the suspension members 66. The adjustment mechanism may also include a lead screw 92 extending through and threadedly engaging the guide nut 90. The lead screw 92 may be attached to an compensation actuator 94 which is fixedly secured via a bracket to the carriage cross member 48. The actuator 94 is disposed toward the front of the seat so it can be accessed by the seat occupant while in the seated position. Rotation of the actuator 94 causes the suspension members 66 to move guided by the channels 62. Movement of the suspension members 66 over the pivot block 86 effectively changes the distance between the suspension bar pins 74, which engage the support rails 44 secured to the seat frame 30, and the pivot block 86. Alternatively, it is further contemplated that other linear adjusting devices known in the art could be used to translate the suspension members 66.

With reference to FIG. 7, shock compensating mechanism 45 further includes a shock compensating device 80. The adjustment member distal ends 70 are pivotally secured to a lower end of the shock compensating device 80. The shock compensating device 80 may include a biasing device 82, such as a coil spring, and a shock dampener 84 to absorb and dampen shock impulses. The upper end of the of the shock compensating device 80 is secured to mounting block 85, which is fixed to post 55. The connection between the shock compensating device 80 and the suspension members 66 may permit the shock compensating device 80 to pivot relative to the suspension members 66. The shock dampener 84 may have a threaded body 81 and an adjustment ring 83 may be threaded on the body 81 and engagement with one end of the biasing device 82. Movement of the adjustment ring 83 up and down along the threaded body 81 results in compression or decompression of the biasing device to adjust the biasing device's characteristics.

As shown in FIGS. 7-9, the suspension members 66 are each supported by a pivot block 86. The pivot block 86 is pivotally secured between two spaced flanges 56 extending downwardly from cross bar 58. Rod 60 extends through the width of the pivot block 86. The pivot block 86 includes a planar support surface 87 on which the suspension members 66 may slide and pivot. The pivot block 86 functions as a fulcrum for the pivoting suspension members 66. The pivot block 86 may be formed of a nylon material or other material which helps facilitate a sliding motion. The pivot block 86 provides support to the suspension members 66 and also permits them to pivot as the carriage assembly 43 moves up and down.

With specific reference to FIGS. 7 and 8, the suspension members 66 are movable such that the distance between the pins 74 and their guide blocks which ride in the channels move closer to or further away from the pivot block 86. When the suspension members 66 are moved forwardly, as shown in FIG. 7, more length of the suspension members hang over the front of the pivot block 86, thereby increasing the torque that can exerted by the occupant in the seat on the shock compensating device 80. This increase in the force exertable on the biasing device 82 and damper 84 tends to create a softer ride with greater seat displacement relative to the support surface 14.

When the rod 74 and their guide blocks 76 are moved closer to the pivot block 86, as shown in FIG. 8, less torque is exerted by the occupant in the seat on the shock compensating device 80. This tends to lead to a stiffer ride with less seat movement relative to the support surface 14.

As a craft 11 is moving and experiences a shock caused by a wave or land form, the seat 32 will move up toward the occupant guided by the plate 61 and the post 55. When the weight of an occupant is exerted on the seat due to the shock, the resulting force is transferred from the support rails 44 to the suspension members 66 though the guide pins 74. The suspension members 66 pivot as forces are applied. The force is then transferred to the end of the shock compensating device 80. As noted above, by turning the actuator 94, the distance that the suspension members 66 extend beyond the pivot block 86 is changed. By changing the distance that the suspension members 66 extend beyond the pivot block 86, the effects of the force transmitted to the seat can be varied. The movement characteristics, such as the about of movement, of the seat frame 30 and seat 32 thereon are also affected.

For example, when the suspension members 66 are moved forwardly to a position such that there is maximum amount of extending beyond the pivot block 86, a maximum force can be applied to the shock compensating device 80. In contrast, when the suspension members 66 are moved rearwardly such that there is a minimum amount of suspension bar overhanging the pivot block 86, the less amount of force is applied by the weight of the occupant.

In operation, when the suspension members 66 are moved such that there is an increased amount extending beyond the pivot block 86, there is more travel created during impacts imparted to the system. Therefore, with greater travel there is more dampening opportunity and the ride is felt by the seat passenger as being soft. When the suspension members 66 are moved rearwardly such that there is less overhang of the pivot block 86, the ride is stiffened as there is less movement accommodated by the system 10. Accordingly, the shock compensation characteristics may be selected by the seat occupant in order to have the maximum comfort for the particular conditions.

Figure 6:
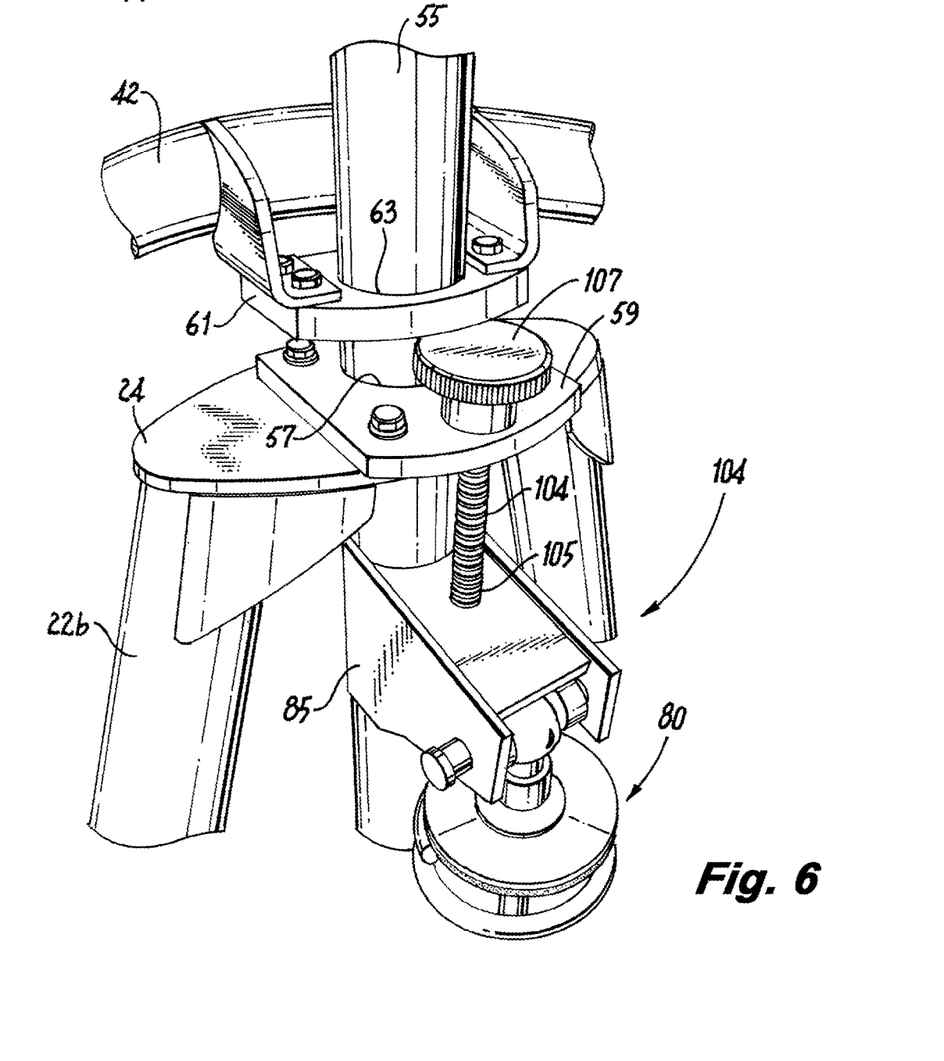
FIG. 6 is a partial rear perspective detail view of a seat frame upper portion.

With reference to FIGS. 6 and 7, the seat suspension assembly 10 further includes a height adjustment mechanism 105 to adjust the height of the seat 32 while maintaining the shock compensation feature. The height adjustment mechanism 104 is disposed between the carriage assembly 43 and the base frame. The mechanism 104 includes a height actuator 105 which upon activation causes the carriage assembly 43 and seat frame 30 to both translate up and down relative to the base frame 12 and support surface 14. The crossbar 58, to which the support rails 44 are secured, includes at both of its ends a pin 106 and a guide disk 108. The guide disks 108 may be formed of nylon or other non-metallic material and disposed between the body of the crossbar and base uprights in order to permit for smooth motion. The height adjustment mechanism 105 may further include opposed slots 110 formed in the base uprights which extend generally in the vertical direction. The pins 106 extend within the slots to permit guided movement of the crossbar 58. As the seat height is adjusted the movement is further guided by the interaction of the post 55 and plate 24.

A height actuator 105 may include a user engageable portion 107, such as a knob, and a threaded rod 109 threadedly secured to the base top cross member 24 and to the mounting block 85 fixed to the vertical post 55. When the user engageable portion 107 is rotated, the seat frame 30 and the cross member 58 move upwardly. This causes the support rails 44 to also move upwardly along with the suspension members 66 in order to adjust the height of the seat. Accordingly, the entire seat frame 30 and carriage assembly 43 may be raised and lowered by actuation of the height adjustment actuator 104. Therefore, the adjustment of the seat height does not change the shock compensating characteristics of the suspension seat assembly 10.

It is within the contemplation of the present disclosure that the height actuator 104 could include a motorized mechanism to permit the seat occupant to adjust the height by way of a switch in a manner known in the art to a position to provide the desired comfort.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A seat suspension comprising:
   a base frame fixedly securable to a structure;
   a seat frame adapted to receive a seat, the seat frame having a bottom portion and a back portion extending upwardly from the bottom portion;
   a carriage assembly movably connected to the base frame, the carriage assembly including a transverse member slidably connected to the base frame and a vertical guide member extending upwardly from the transverse guide member and movably connected to the base frame, and a suspension support having a first end pivotally secured to the transverse member and a second opposed end, the seat frame base portion being pivotally secured to the suspension support and the seat frame back portion being connected to the vertical guide member and translatable relative thereto, wherein the seat frame back portion is restricted to movement along a linear axis parallel to a longitudinal axis of the vertical guide member; and
   a shock compensating mechanism including an adjustment member slidably disposed on a pivot surface secured to the transverse member, the adjustment member having a first end slidingly secured to the suspension support and a second opposed end secured to a shock compensating device, the adjustment member being translatable relative to the pivot surface, wherein movement of the adjustment member changes shock compensation properties of the shock compensating mechanism.

2. The seat suspension as defined in claim 1, wherein the shock compensation adjustment member includes a first suspension bar and a second suspension bar spaced therefrom, the first suspension bar and the second suspension bar being slidably disposed on the pivot surface.

3. The seat suspension as defined in claim 2, wherein the suspension support includes a pair of spaced rails each include a channel, and the first and second suspension members each include a guide member disposed in one of the channels, the guide members being translatable within the channels.

4. The seat suspension as defined in claim 2, wherein the adjustment member including an actuator operably connected between the carriage assembly and the suspension assembly, the actuator adjusting the position of the shock compensating device relative to the frame.

5. The seat suspension as defined in claim 4, wherein the actuator has a user engageable portion connected to the carriage assembly and has a drive element connect to the user engageable portion and extending to a block secured to the first and second suspension members, wherein actuation of the user engageable portion moves the first and second suspension members and adjusts the position of the shock compensating mechanism shock compensation properties of the suspension assembly.

6. The seat suspension as defined in claim 3, wherein the first and second suspension members have a first position wherein the guide members are spaced a first distance from the pivot surface and a second position wherein the guide members are spaced a second distance from the pivot surface, wherein the first distance is greater than the second distance.

7. The seat suspension as defined in claim 1, further including a height adjustment mechanism having a height adjustment actuator wherein the height adjustment actuator adjusts the position of the carriage assembly, the seat frame, and the suspension assembly relative to the base frame.

8. The seat suspension as defined in claim 7, wherein and the base frame includes a pair of spaced slots and the transverse member has opposed ends extending into the spaced slots, and the height adjustment actuator causing the transverse member to move guided by the slots relative to the base frame.

9. The seat suspension as defined in claim 1, wherein the shock compensating device includes a spring.

10. The seat suspension as defined in claim 9, wherein the shock compensating device includes a shock dampener.

11. The seat suspension as defined in claim 1, wherein the shock compensating device is disposed behind the frame.

12. The seat suspension as defined in claim 5, wherein the carriage base includes a pair of spaced elongate members each have a second end joined together by a cross member, the user engageable portion of the actuator being secured to the cross member.

13. The seat suspension as defined in claim 7, wherein the base frame includes a back portion and a bottom portion, the bottom portion being securable to the support surface, the height adjustment mechanism having a first end connected to the frame back portion and a second end connected to the vertical guide member.

14. A seat suspension comprising:
a base frame including a back portion and a bottom portion, the bottom portion being fixedly securable to a support surface;
a carriage assembly movably connected to the base frame, the carriage assembly including a transverse and a vertical guide member extending upwardly from the transverse guide member, the vertical guide member being movably operably coupled to the base frame, and a carriage base having a first end pivotally secured to the transverse member; and
a seat having a bottom portion and a back portion extending upwardly from the bottom portion, the seat back portion being connected to the vertical guide member and translatable relative thereto, wherein the seat frame back portion is restricted to movement along a linear axis parallel to a longitudinal axis of the vertical guide member;
a shock compensating mechanism including an adjustment member slidably disposed on a pivot surface operably connected to the transverse guide member, wherein movement of the adjustment member changes shock compensation properties of the shock compensating mechanism; and
a height adjustment mechanism operably connected to the base frame and the carriage assembly, the height adjustment mechanism including an actuator wherein operation of the actuator selectively moves the seat, the carriage assembly, and the shock compensating mechanism up and down relative to the base frame.

15. The seat suspension as defined in claim 14, wherein the seat includes a frame base portion being pivotally secured to the carriage base and the seat includes a frame back portion being guidingly supported by the vertical guide member and translatable relative thereto wherein the seat frame back portion is restricted to movement along a linear axis parallel to a longitudinal axis of the vertical guide member.

16. The seat suspension as defined in claim 15, wherein the adjustment member has a first end slidingly secured to the carriage base and a second opposed end secured to a shock compensating device, the adjustment member being translatable relative to the pivot surface.

17. The seat suspension as defined in claim 16, wherein the adjustment member includes a pair of spaced rails each slidably supported on the pivot surface.

18. The seat suspension as defined in claim 16, wherein the shock compensating device includes a biasing device and a dampening device.

19. The seat suspension as defined in claim 14, wherein the height adjustment mechanism is connected between the base frame and the vertical guide member.

20. The seat suspension as defined in claim 14, wherein the base frame includes a pair of spaced members each having a slot therein, wherein a portion of the carriage assembly being slidably disposed in the slots to permit height adjustment of the carriage assembly and the seat frame.

21. The seat suspension as defined in claim 14, wherein the carriage base includes a second end pivotally secured to the seat frame.

22. The seat suspension as defined in claim 21, wherein the carriage base includes a pair of rails and each of the pair of rails include a channel having an open face, and the shock compensation adjustment member includes a pair of guide blocks with each of the guide blocks disposed in one of the channels.

23. The seat suspension as defined in claim 1, wherein a plate is rotationally fixedly secured to the seat back portion and extends outwardly therefrom, the plate having an opening therein through which the vertical guide member extends.

24. A seat suspension comprising:
a base frame fixedly securable to a structure;
a seat having a bottom portion and a back portion extending upwardly from the bottom portion;
a carriage assembly movably connected to the base frame, the carriage assembly including a transverse member and a vertical guide member extending upwardly from the transverse member and the vertical guide member being movably coupled to the base frame;
a suspension support having a first end pivotally secured to the transverse member and a second opposed end, the seat bottom portion being pivotally secured to the suspension support, and the seat back portion being connected to the vertical guide member and translatable relative thereto, wherein the seat back portion is restricted to movement along a linear axis parallel to a longitudinal axis of the vertical guide member; and
a shock compensating mechanism including an adjustment member slidably disposed on a pivot support having a pivot surface, the pivot support being operably connected to the transverse member, the adjustment member having a first end slidingly engaging the suspension support and a second opposed end secured to a shock compensating device, the adjustment member being translatable relative to the pivot surface, wherein movement of the adjustment member changes shock compensation properties of the shock compensating mechanism.

25. The seat suspension as defined in claim 24, wherein the adjustment member includes a pair of spaced elongate members.

26. The seat suspension as defined in claim 25, wherein the suspension support includes a pair of spaced rails, and the adjustment member is disposed between the spaced rails.

27. The seat suspension as defined in claim 25, wherein the seat includes a seat frame.

28. The seat suspension as defined in claim 24, wherein the transverse member includes two downwardly extending members operably secured to the suspension support.

29. The seat suspension as defined in claim 24, wherein a plate is rotationally fixedly secured to the seat back portion and extends outwardly therefrom, the plate has an opening therein through which the vertical guide member extends.

30. The seat suspension as defined in claim 24, wherein a height adjustment mechanism is operably connected to the base frame and the carriage assembly, the height adjustment mechanism including an actuator wherein operation of the actuator selectively moves the seat, the carriage assembly, and the shock compensating mechanism up and down relative to the base frame.

\* \* \* \* \*